No. 873,075. PATENTED DEC. 10, 1907.
A. OLIVER.
TURBINE.
APPLICATION FILED JAN. 22, 1907.
2 SHEETS—SHEET 2.
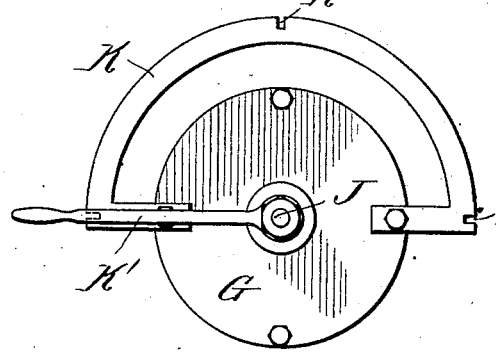
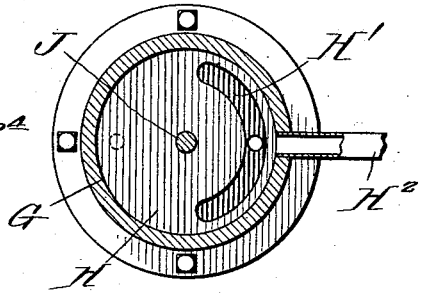
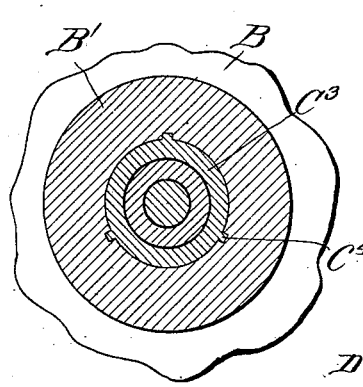
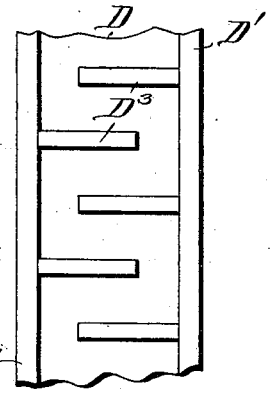
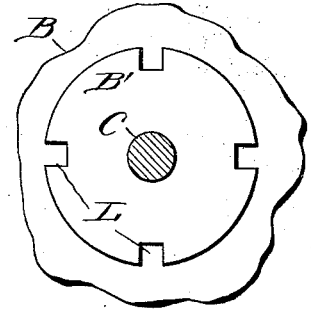
Witnesses
Inventor
Alfred Oliver
By O'Meara & Brock
Attorneys

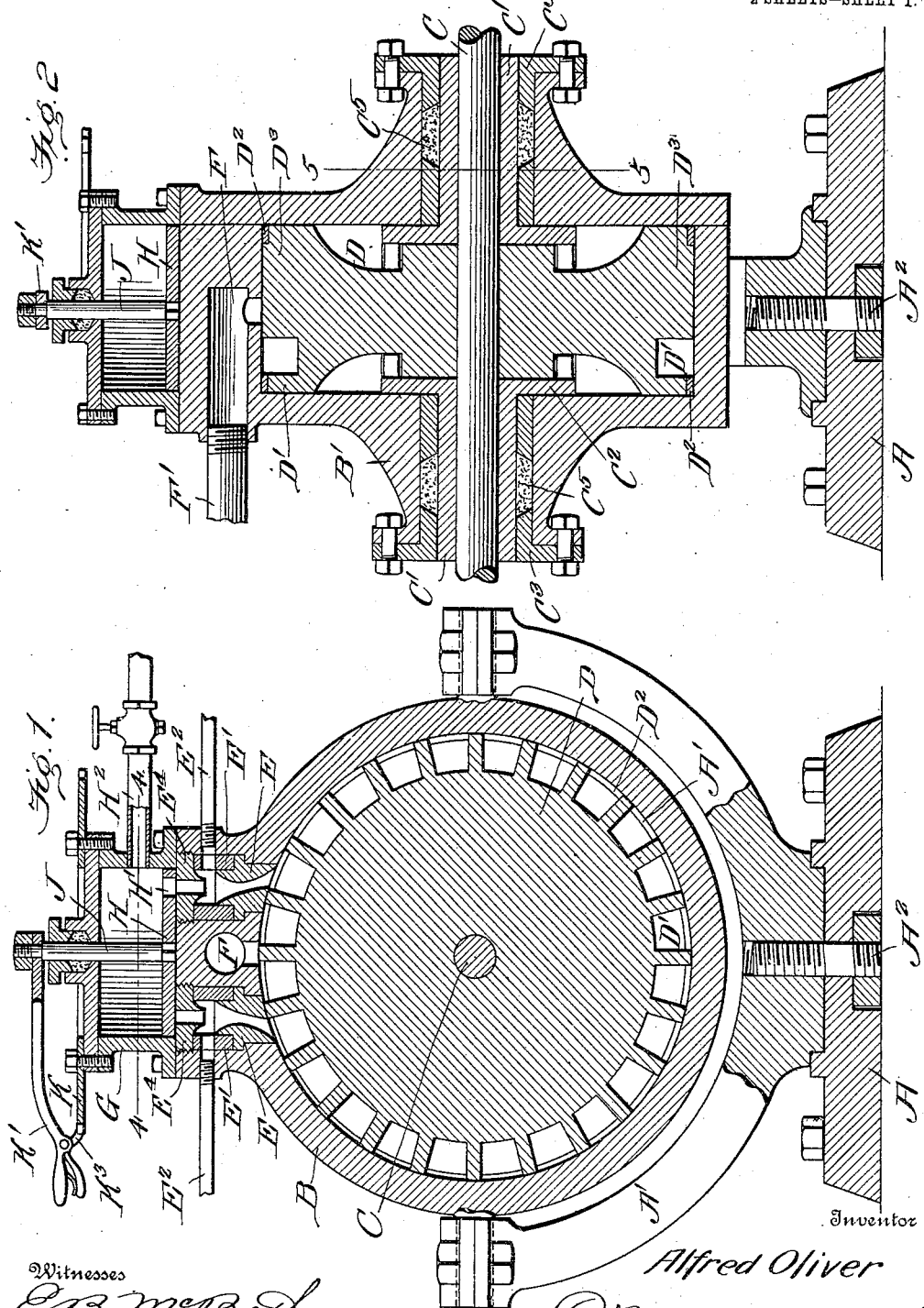

UNITED STATES PATENT OFFICE.

ALFRED OLIVER, OF ALPENA, MICHIGAN.

TURBINE.

No. 873,075.    Specification of Letters Patent.    Patented Dec. 10, 1907.

Application filed January 22, 1907. Serial No. 353,490.

To all whom it may concern:

Be it known that I, ALFRED OLIVER, a citizen of the United States, residing at Alpena, in the county of Alpena and State of Michigan, have invented a new and useful Improvement in Turbine-Engines, of which the following is a specification.

This invention relates to a reversible engine of the turbine type, provided with a shaft journaled in floating bearings, and mounted upon a rotatable bracket so that the cylinder carrying the turbine wheel and in which the driven shaft is journaled can be rotated so that the shaft will always be held in proper alinement with the work to be performed.

In the accompanying drawings—Figure 1 is a vertical section through the engine, a part of the supporting bracket being shown in elevation; Fig. 2 is a section taken at right angles to Fig. 1; Fig. 3 is a plan view of a valve casing; Fig. 4 is a section on the line 4—4 of Fig. 1; Fig. 5 is a section on the line 5—5 of Fig. 2; Fig. 6 is a plan view of a portion of the periphery of the turbine wheel; Fig. 7 is a view partly in section of a modification.

In these drawings A represents a suitable base upon which is mounted rotatable bracket A', comprising two curved oppositely arranged arms and the bracket is held in position upon the base A by a vertically arranged threaded rod, which rod is rotatable with respect to the base A. Suspended between the arms on the bracket A' is a cylinder B which is provided upon opposite sides with projecting hub portions B' and in these hub portions is journaled a shaft C which passes transversely through the center of the casing. To prevent wear of the shaft and facilitate repairs the shaft is surrounded by sleeves C' which at their inner ends are provided with sleeves $C^2$ which bear upon the inner faces of the cylinder B. The sleeves C' fit within suitable bushings $C^3$ and these bushings are provided with ribs $C^4$, as shown in Fig. 5 which fit within corresponding grooves cut in the hubs B' thereby preventing any rotation of the bushings within the hubs. The bushings $C^4$ are cut out and any suitable packing or lubricant is packed in the cut out portions and bears upon the sleeves C'. It will be obvious therefore that the shaft C does not bear upon any fixed portion of the cylinder B and that all wear will be taken by the sleeves C' and when the said sleeves become worn they can be readily replaced by new sleeves thus avoiding the expense of providing a new shaft. A turbine wheel D is mounted within the casing B and is fixed to the shaft C and this wheel is provided on its periphery with two side flanges D' and the space between said flanges is provided with transversely arranged teeth $D^3$ which are slightly higher than the flanges and which extend alternately from the flanges, each tooth stopping short of the opposite flange. This provides a zigzag passage around the periphery of the wall for the passage of steam or other fluid. Upon each flange D' is fitted a suitable packing ring $D^2$, the upper surface of which is flush with the upper edge of the teeth $D^3$. There is, therefore, no space between the circumferential wall of the cylinder B and the teeth $D^3$ or between said wall and the rings $D^2$ so that the steam or other fluid cannot escape from the wall D except by following the passage formed by said teeth. The top of the casing is suitably cut out and in this cut out portion I fit plugs E which are provided with inlet passages, which passages are slightly curved in opposite directions so that the force of the fluid admitted to the wheel may be directed either to the right or the left.

Over the plugs E are fitted bushings E' which serve to hold the plugs in place and these bushings have openings formed in their sides and pipes $E^2$ discharge into these openings and admit air or other vapor. Upon the bushings E' are threaded nozzles $E^3$ for the purpose of admitting steam into the bushings E'. These nozzles may be quickly unscrewed and replaced by others having larger or smaller bores according to the purpose for which the engine is to be used, or according to the fluid to be admitted to the pipes $E^2$. I provide also in that part of the casing between the two inlet plugs E an exhaust port F which communicates with an exhaust pipe F'. Upon the top of the cylinder is mounted a valve casing G and in this casing is placed a rotatable disk valve H provided with a curved slot H' which, as the valve is rotated may be brought into alinement with either of the nozzles $E^4$ or placed in such position that it will fail to communicate with either of them. By providing the valve H with a curved slot of considerable length a similar movement of a hand lever K is required in order to open or close the valve. A steam pipe $H^2$ discharges into the valve casing H and a valve stem J is carried by the valve disk H and passes upwardly through the top casing. A rack segment K is also carried by the casing, said segment being arranged horizontally and provided preferably with suitable notches $K^4$ one adjacent each end of the segment and one midway its ends. A lever K' is fixed to the upper end of the stem J and is provided with a hand grip $K^3$ of the usual type which grip engages the notches $K^4$. Steam is admitted through the pipe $H^2$ and through one of the nozzles $E^4$ into a bushing E' and thence through the communicating plug E to the periphery of the wheel D. Air or any other suitable vapor or gas which it is desired to commingle with the steam is admitted through the pipe $E^2$ and enters with the steam and the commingled steam and air travels in a zigzag fashion around the periphery of the wheel D until it reaches the exhaust opening F from which it passes into the exhaust pipe F'. By throwing the lever K' so that the grip $K^3$ will engage the middle notch $K^4$, the steam supplied will be shut off and the engine stopped. By throwing it around to the third notch of the segment steam will be admitted through the other nozzle $E^4$ and plug E and the steam and air will travel in the opposite direction to the periphery of the wheel, thus reversing the engine.

It will be understood that the source of power is the impact, or velocity of the steam and air traveling around the periphery of the wheel, the velocity of said travel causing the steam to impact against each of the teeth in its passage around the wheel. By turning the brackets A' upon the base A the shaft C can be brought into proper position to be connected to any machinery to be driven by the engine.

Having thus fully described my invention what I claim as new and desire to secure by Letters Patent of the United States is—

1. An engine of the kind described comprising a base, a bracket having oppositely extending arms and rotatably mounted upon the base, a cylinder suspended between said arms, a turbine wheel carried by said cylinder, and a shaft passing through the cylinder and fixed to the wheel.

2. A device of the kind described comprising a base, a bracket movable upon said base, a cylinder supported by the bracket, a shaft passing through the cylinder, floating bearings for the shaft, a turbine wheel fixed upon the shaft, means for admitting air to said wheel, and means for directing steam to the said wheel in different directions.

3. A turbine engine of the kind described comprising a rotatable cylinder, a shaft journaled in said cylinder upon floating bearings, a turbine wheel arranged within the cylinder and fixed to the shaft, said wheel having a zigzag passage upon its periphery, oppositely arranged plugs having steam inlets, said inlets communicating with the passage formed on the wheel, pipes admitting air to the passages of said plugs, means for admitting steam to said plugs, and means for controlling the admission of said steam.

4. A turbine engine of the kind described, comprising a cylinder, a shaft therethrough, a turbine wheel upon said shaft, said cylinder being provided with steam inlets and an exhaust outlet, the exhaust outlet being arranged between the steam inlets, a valve casing, a steam pipe opening into said casing, a disk valve arranged in the casing and slotted, means for bringing said slot into alinement with either of the inlet passages, and pipes opening into the cylinder to admit air at points between the valve casing and the inlet passages, as and for the purpose described.

ALFRED OLIVER.

Witnesses:
GEORGE W. MANION,
GUST ZADOW.